(12) United States Patent
Su et al.

(10) Patent No.: US 6,712,321 B1
(45) Date of Patent: Mar. 30, 2004

(54) ADJUSTABLE SUPPORTING DEVICE FOR A DISPLAY PANEL

(75) Inventors: Wen-Yi Su, Taipei (TW); Lin-Yang Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 10/442,160

(22) Filed: May 21, 2003

(51) Int. Cl.$^7$ ................................................. A47F 5/00
(52) U.S. Cl. .................................. 248/123.11; 248/917
(58) Field of Search ............................... 248/920, 917, 248/918, 123.11, 125.2, 125.1, 162.1, 157, 280.11, 274.1

(56) References Cited

U.S. PATENT DOCUMENTS

| | | | | |
|---|---|---|---|---|
| 4,545,555 A | * | 10/1985 | Koch | 248/280.11 |
| 4,703,909 A | * | 11/1987 | Dayton et al. | 248/280.11 |
| 4,768,744 A | * | 9/1988 | Leeds et al. | 248/280.11 |
| 4,783,036 A | * | 11/1988 | Vossoughi | 248/281.11 |
| 5,092,552 A | * | 3/1992 | Dayton et al. | 248/280.11 |
| 5,746,404 A | * | 5/1998 | Merko | 248/123.11 |
| 5,868,079 A | * | 2/1999 | Charny | 108/7 |
| 6,073,892 A | * | 6/2000 | Dittmer | 248/157 |
| 6,113,046 A | * | 9/2000 | Wang | 248/278.1 |
| 6,286,794 B1 | * | 9/2001 | Harbin | 248/123.2 |
| 6,352,226 B1 | * | 3/2002 | Gordon | 248/125.2 |
| 6,394,403 B1 | * | 5/2002 | Hung | 248/276.1 |
| 6,478,275 B1 | * | 11/2002 | Huang | 248/284.1 |
| 2003/0075653 A1 | * | 4/2003 | Li | 248/274.1 |

* cited by examiner

Primary Examiner—Leslie A. Braun
Assistant Examiner—A. Joseph Wujciak
(74) Attorney, Agent, or Firm—Bacon & Thomas, PLLC (57) ABSTRACT

In an adjustable supporting device, a tubular coupling member is disposed uprightly on a supporting base. A movable frame member is movably extended into the coupling member, is in friction engagement with the coupling member, and includes a frame body coupled to a display panel and formed with a passage groove communicated with a receiving space. A biasing member has a straight coupling portion passing through the passage groove and coupled to the coupling member, and a spiral portion having an axis, connected to the coupling portion, and disposed in the receiving space. The movable frame member further includes an axial rod extending through the spiral portion along the axis and engaging the frame body such that the spiral portion of the biasing member is positioned in the receiving space.

8 Claims, 9 Drawing Sheets

ADJUSTABLE SUPPORTING DEVICE FOR A DISPLAY PANEL

BACKGROUND OF THE INVENTION

1. Field of the Invention

The invention relates to a supporting device, more particularly to an adjustable supporting device for a display panel.

2. Description of the Related Art

Figure 1:
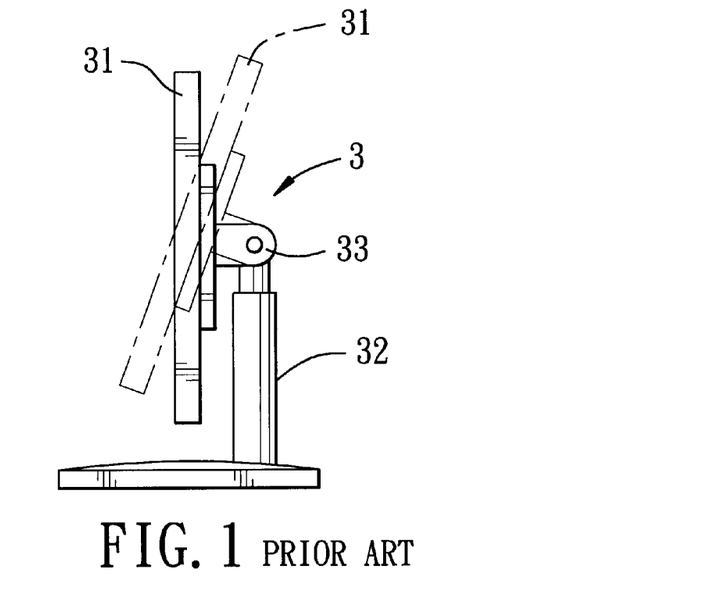
FIG. 1 is a schematic side view of a conventional display device, illustrating how a display panel is pivoted about a first axis.
Figure 2:
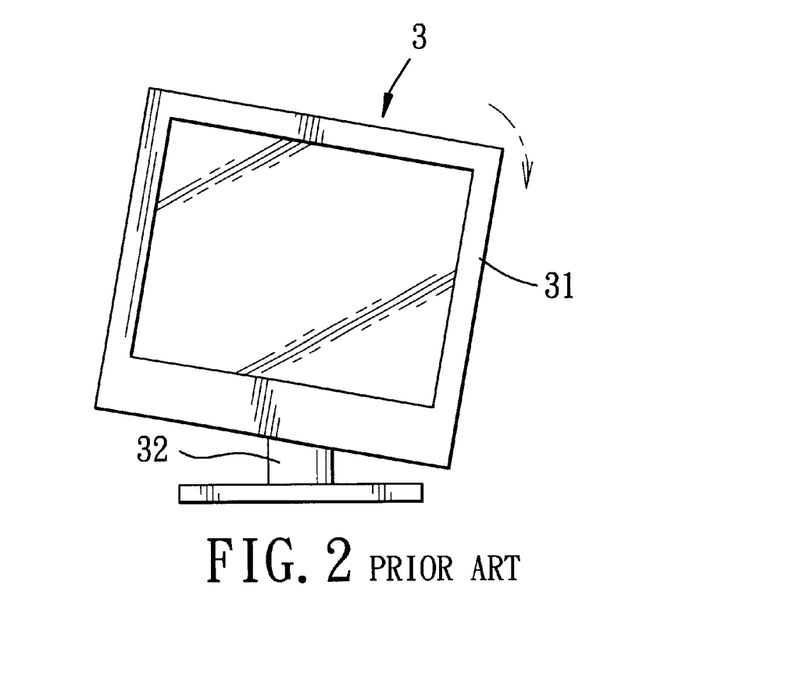
FIG. 2 is a schematic front view of the conventional display device, illustrating how the display panel is pivoted about a second axis transverse to the first axis.

FIGS. 1 and 2 illustrate a conventional display device 3 that includes a liquid crystal display panel 31, a supporting unit 32, and a pivot unit 33 interconnecting the liquid crystal display panel 31 and the supporting unit 32. The liquid crystal display panel 31 is rotatable relative to the supporting unit 32, i.e., the angle between the liquid crystal display panel 31 and the supporting unit 32 can be adjusted, as shown in FIG. 1. The liquid crystal display panel 31 can also be pivoted from an initial position to a desired position by 90 degrees, as shown in FIG. 2.

In order to satisfy different requirements in the height of the liquid crystal display panel 31, the supporting unit 32 needs to be adjusted.

However, when adjusting the height of the liquid crystal display panel 31, detachment of certain elements (not shown) in the supporting unit 32 is required, thereby resulting in inconvenience during use.

SUMMARY OF THE INVENTION

Therefore, the object of the present invention is to provide adjustable supporting device for a display panel which can overcome the aforesaid drawback associated with the prior art.

According to the present invention, there is provided an adjustable supporting device for a display panel. The adjustable supporting device comprises:

a supporting base;

a tubular coupling member disposed uprightly on the supporting base and extending in a first direction, the coupling member having an upper end, and a lower end connected to the supporting base;

a movable frame member movably extended into the coupling member and in friction engagement with the coupling member, the movable frame member including a frame body that has an upper end portion adapted to be coupled to the display panel, and a lower end portion formed with a receiving space and a passage groove communicated with the receiving space; and a biasing member having a straight coupling portion passing through the passage groove in the lower end portion of the frame body and coupled to the coupling member, and a spiral portion connected to the coupling portion and disposed in the receiving space in the lower end portion of the frame body, the spiral portion having an axis, the biasing member providing a biasing force such that an equilibrium state among the biasing force, a friction force between the coupling member and the movable frame member, and the combined weight of the display panel and the movable frame member is achieved so as to maintain the movable frame member at a desired extended position between upper and lower limit positions relative to the coupling member.

The movable frame member further includes an axial rod extending through the spiral portion along the axis and in a second direction transverse to the first direction. The axial rod engages the frame body such that the spiral portion of the biasing member is positioned in the receiving space in the lower end portion of the frame body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
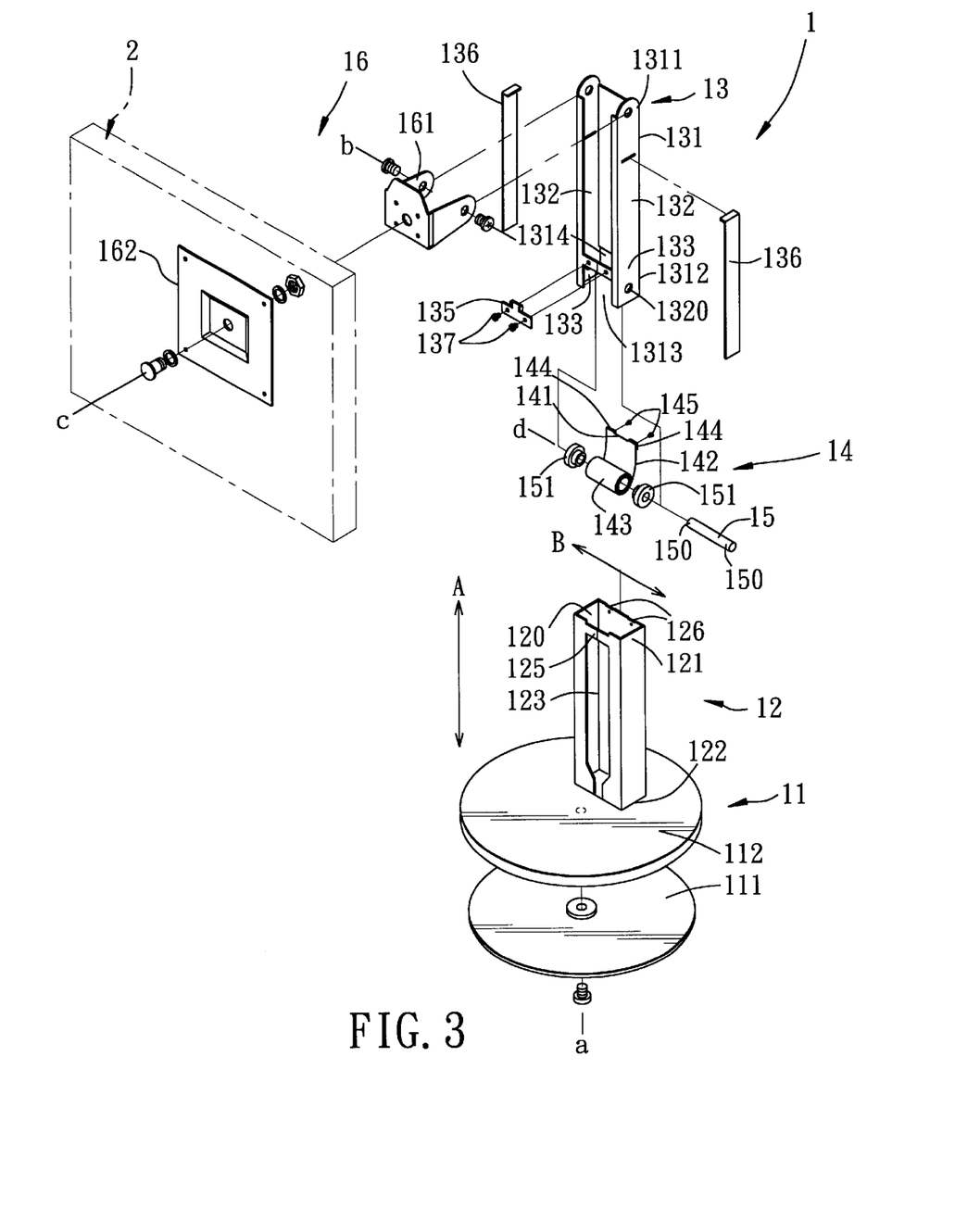
FIG. 3 is an exploded perspective view showing the preferred embodiment of an adjustable supporting device for a display panel according to the present invention.

Referring to FIG. 3, the preferred embodiment of an adjustable supporting device 1 for a display panel 2 according to the present invention is shown to include a rotary supporting base 11, a tubular coupling member 12, a movable frame member 13, a biasing member 14, and a universal joint member 16. In this embodiment, the display panel 2 is a liquid crystal display panel.

In this embodiment, the supporting base 11 includes a stationary lower base member ill, and a rotatable upper base member 112 disposed on top of the lower base member 111 and rotatable relative to the lower base member 111 about an axis (a).

The coupling member 12 is disposed uprightly on the upper base member 112 of the supporting base 11, and extends in a first direction (A) parallel to the axis (a). The coupling member 12 has an upper end 121, and a lower end 122 connected to the upper base member 112 of the supporting base 11. The coupling member 12 is formed with a guiding slot 123 extending in the first direction (A).

The movable frame member 13 is movably extended into the coupling member 12, and is in friction engagement with the coupling member 12. The movable frame member 13 includes a frame body 131 that has an upper end portion 1311 to be connected to the display panel 2, and a lower end portion 1312 formed with a receiving space 1313 and a passage groove 1314 communicated with the receiving space 1313. In this embodiment, the frame body 131 includes opposite lateral walls 132 arranged in a second direction (B) transverse to the first direction (A). Each of the lateral walls 132 has a lower portion 133 formed with an engaging hole 1320. The lower portions 133 of the lateral walls 132 confine the receiving space 1313. The movable frame member 13 further includes a pair of contact plates 136 mounted respectively on the lateral walls 132 of the frame body 131 and abutting against an inner surface 120 of the coupling member 12, and a positioning piece 135 mounted on the lower end portion 1312 of the frame body 131 by means of two screw fasteners 137, which extend through the positioning piece 135 and which engage the lower end portion 1312 of the frame body 131. The positioning piece 135 extends into and is movable along the guiding slot 123.

Figure 4:
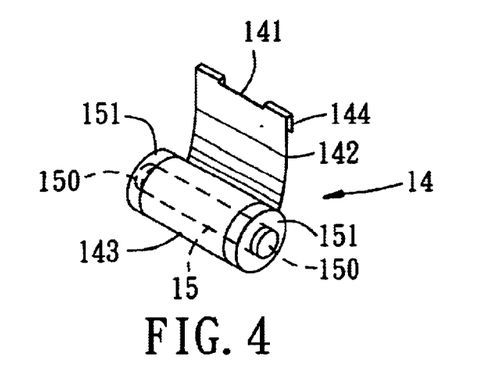
FIG. 4 is a perspective view showing an assembly of a biasing member, a pair of end caps and an axial rod of the preferred embodiment.
Figure 6:
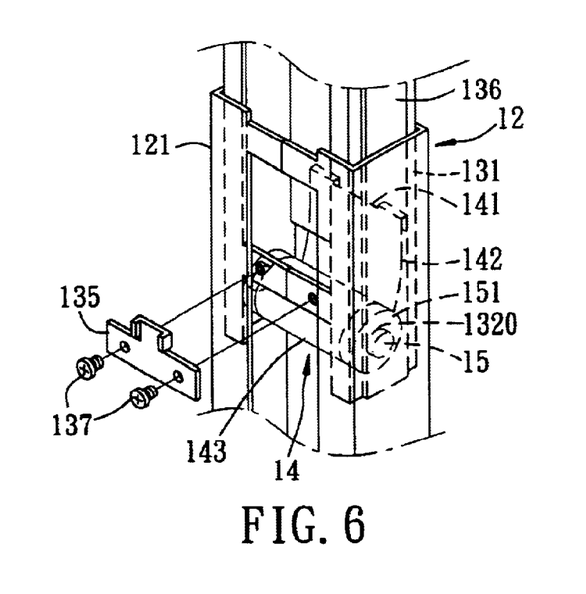
FIG. 6 is a fragmentary perspective view illustrating how a positioning piece is assembled to the movable frame member in the preferred embodiment.
Figure 8:
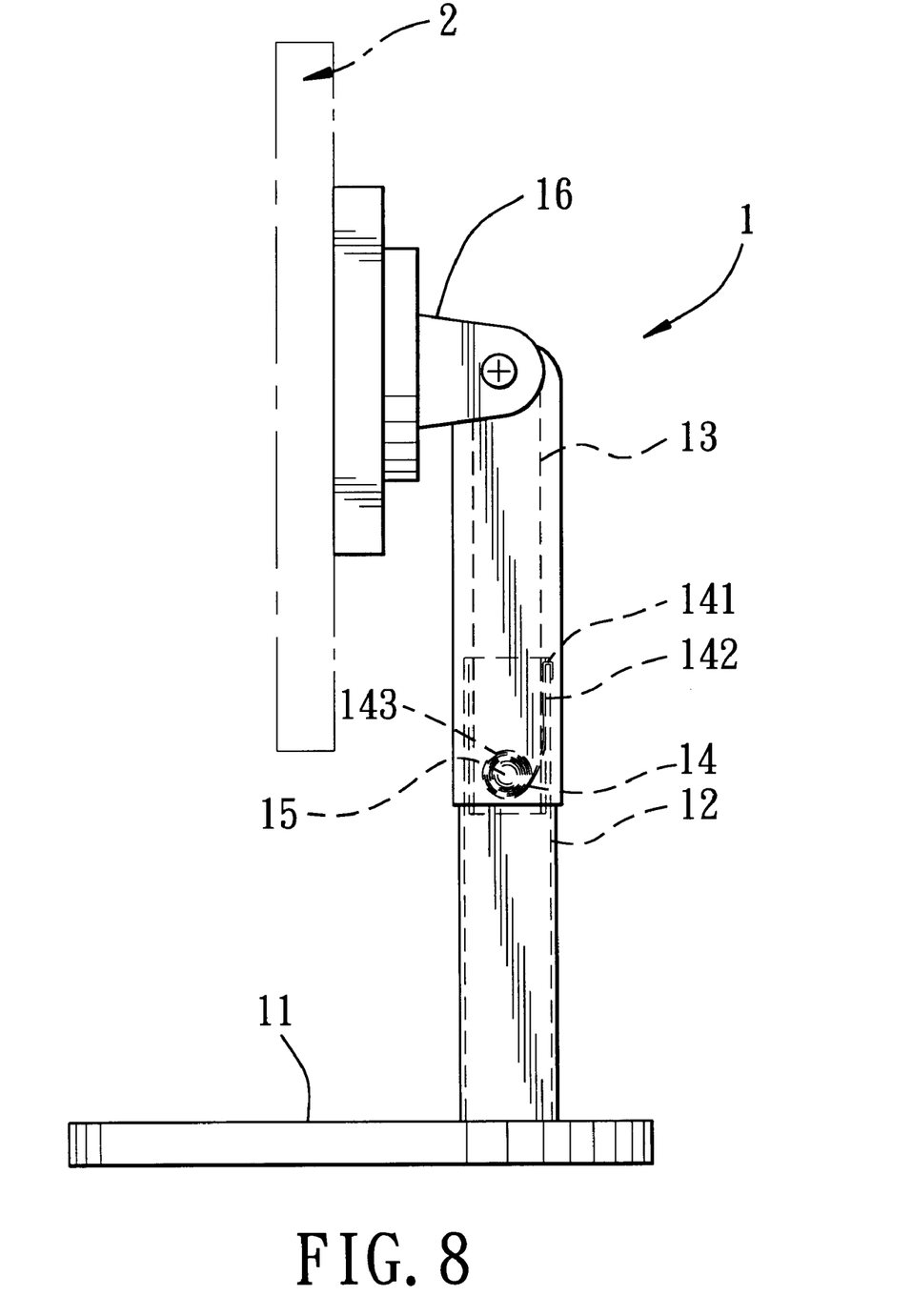
FIG. 8 is a schematic side view showing the preferred embodiment when the movable frame member is disposed at an upper limit position.
Figure 9:
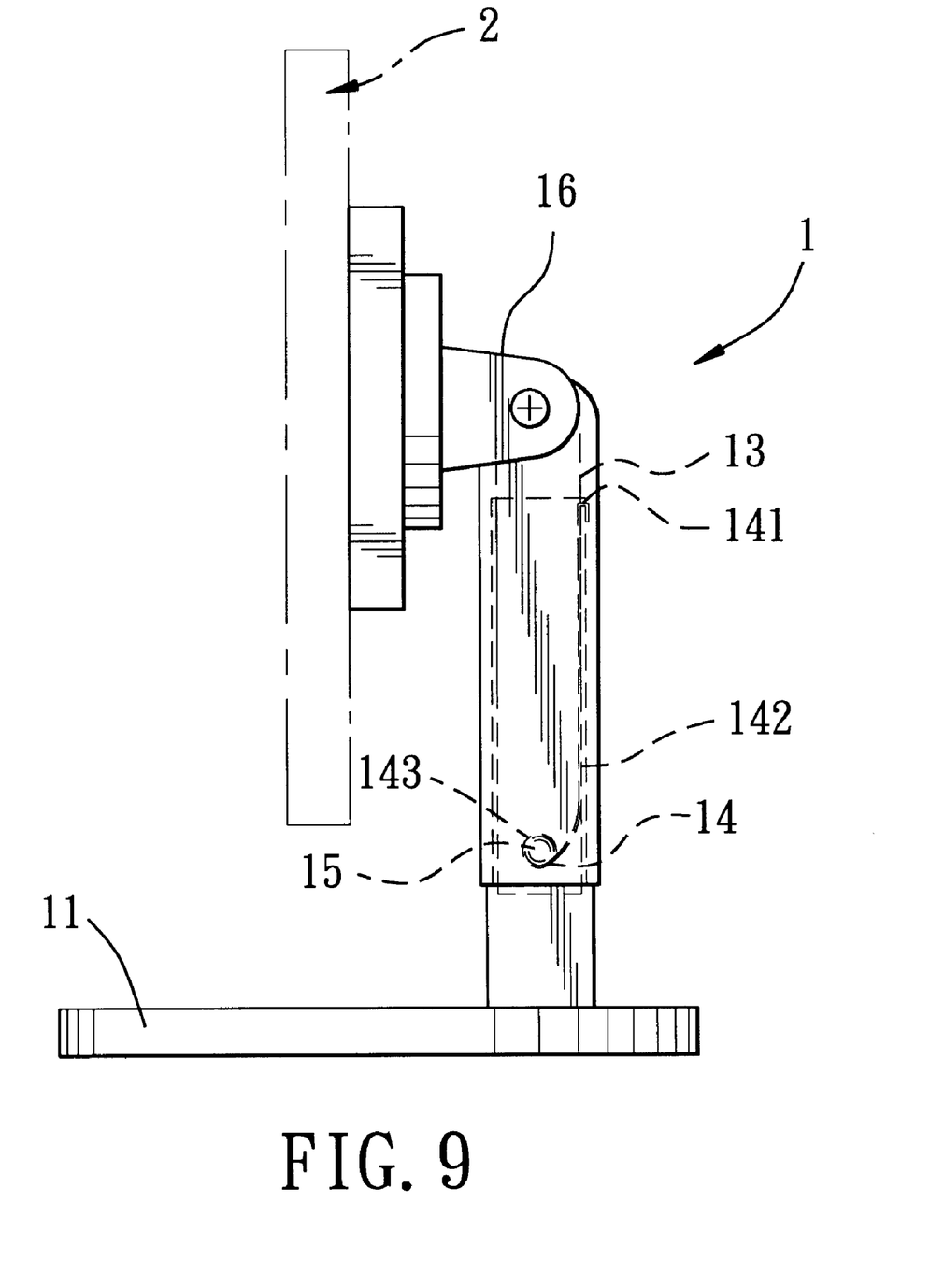
FIG. 9 is a schematic side view showing the preferred embodiment when the movable frame member is disposed at a lower limit position.

In this embodiment, the biasing member 14 is a spiral spring that has a straight coupling portion 142 passing through the passage groove 1314 in the lower end portion 1312 of the frame body 131 and coupled to the coupling member 12, and a spiral portion 143 connected to the coupling portion 142 and disposed in the receiving space 1313 in the lower end portion 1312 of the frame body 131. The spiral portion 143 has an axis (d) In this embodiment, the movable frame member 13 further includes an axial rod 15 extending through the spiral portion 143 along the axis (d) and in the second direction (B) A pair of end caps 151 are sleeved on the axial rod 15 and abut against opposite sides of the spiral portion 143 in the second direction (B), respectively, as best shown in FIG. 4. The axial rod 15 has opposite ends 150, each of which engages a corresponding one of the engaging holes 1320 in the lower portions 133 of the lateral walls 132, as best shown in FIG. 6. As such, the axial rod 15 engages the frame body 131 such that the spiral portion 143 is positioned in the receiving space 1313 in the lower end portion 1312 of the frame body 131. The coupling portion 142 had a distal hook end 141 formed with two engaging hooks 144 that engage two engaging grooves 126 formed in the upper end 121 of the coupling member 12, respectively. Two screw fasteners 145 extend through the engaging hooks 144, respectively, and engage the upper end 121 of the coupling member 12. As such, the coupling portion 142 is anchored on the upper end 121 of the coupling member 12. The biasing member 14 provides a biasing force such that an equilibrium state among the biasing force, a friction force between the coupling member 12 and the movable frame member 13, and the combined weight of the display panel 2 and the movable frame member 13 is achieved so as to maintain the movable frame member 13 at a desired extended position between upper and lower limit positions relative to the coupling member 12 (see FIGS. 8 and 9). It is noted that the torsion of the biasing member 14 is selected according to the weight of the display panel 2. For example, the torsion of the biasing member 14 is preferably a value within 19–24.5 kg/cm for a display panel with a 15-inch size, and is preferably a value within 38.5–46.5 kg/cm for a display panel with a 17-inch size.

Figure 5:
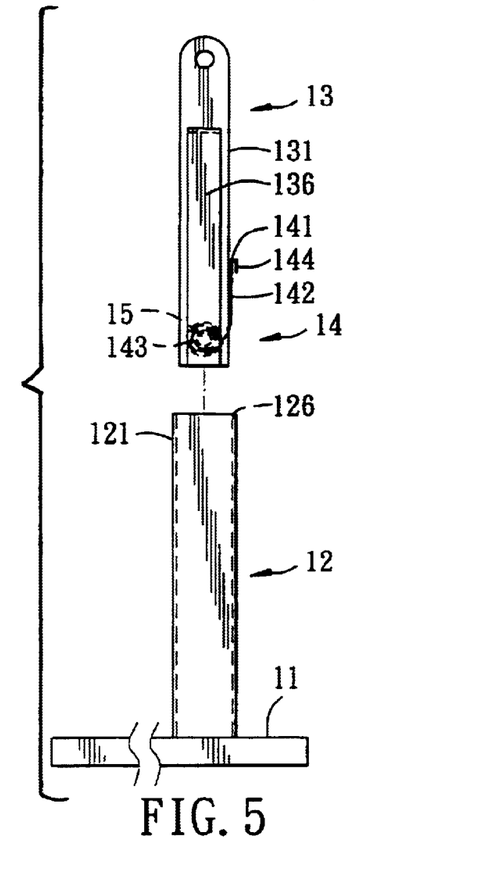
FIG. 5 is a fragmentary partly exploded schematic view illustrating how a movable frame member assembled with the biasing member is assembled to a coupling member in the preferred embodiment.

After assembling the biasing member 14, the axial rod 15 and the end caps 151 in the manner as shown in FIG. 4, the biasing member 14 together with the axial rod 15 and the end caps 151 is then assembled to the lower end portion 1312 of the frame body 131. Then, the movable frame member 13 with the contact plates 136 secured thereon is inserted into the coupling member 12, and the coupling portion 142 of the biasing member 14 is anchored on the upper end 121 of the coupling member 12 in the manner described herein above, as shown in FIG. 5. Subsequently, the positioning piece 135 is assembled to the lower end portion 1312 of the frame body 131.

Figure 10:
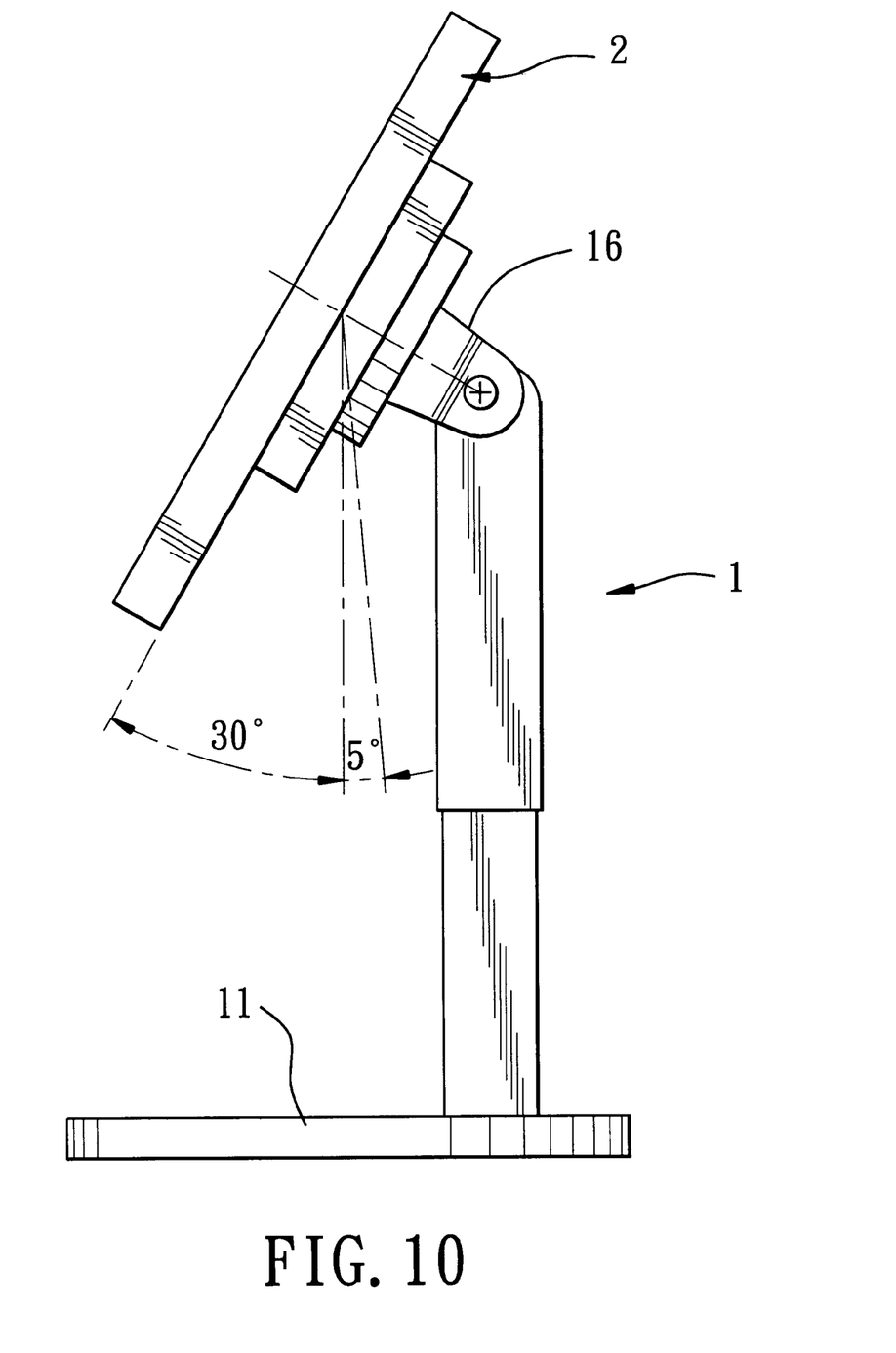
FIG. 10 is a schematic side view showing the preferred embodiment in a state of use.
Figure 11:
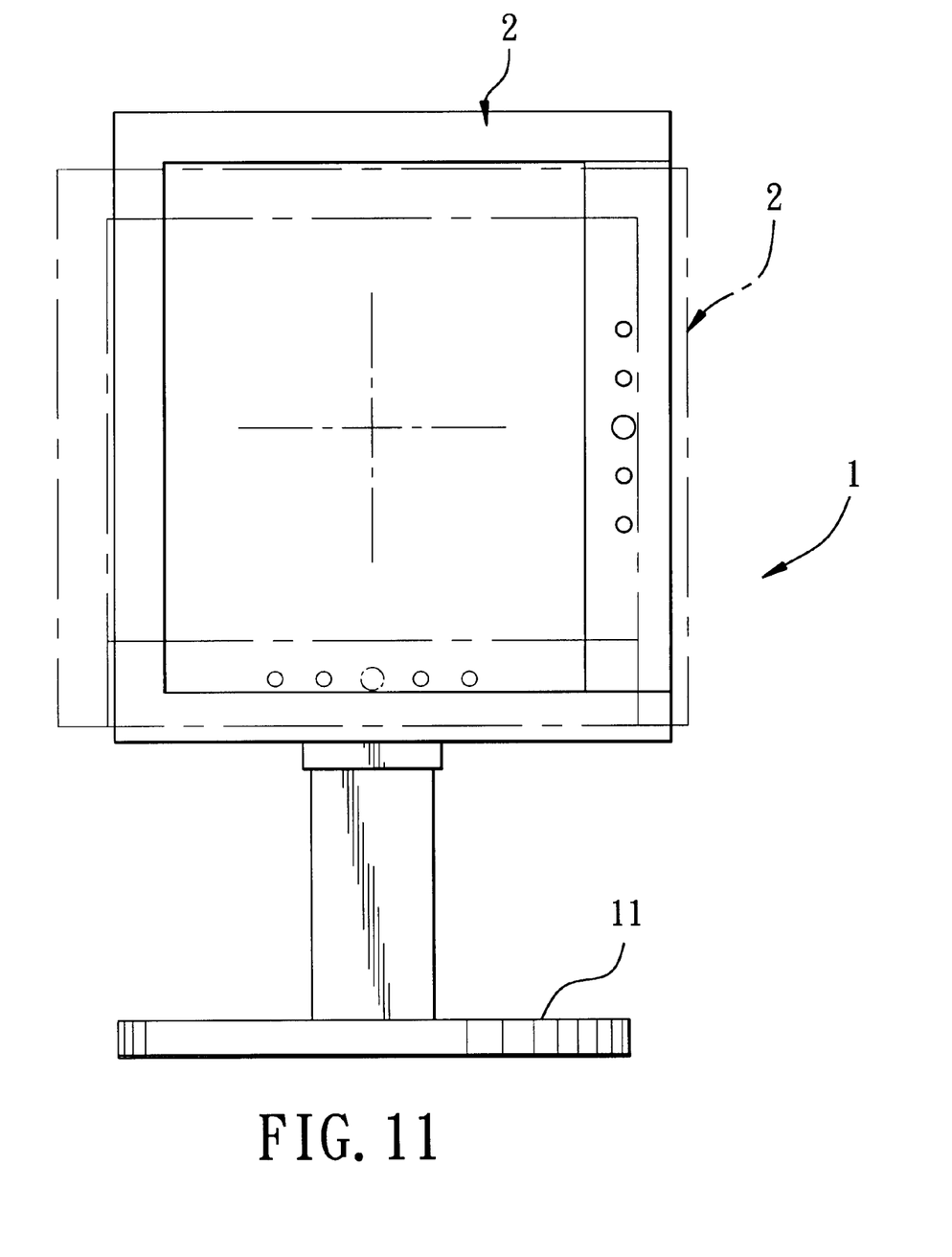
FIG. 11 is a schematic front view showing the preferred embodiment in another state of use.
Figure 12:
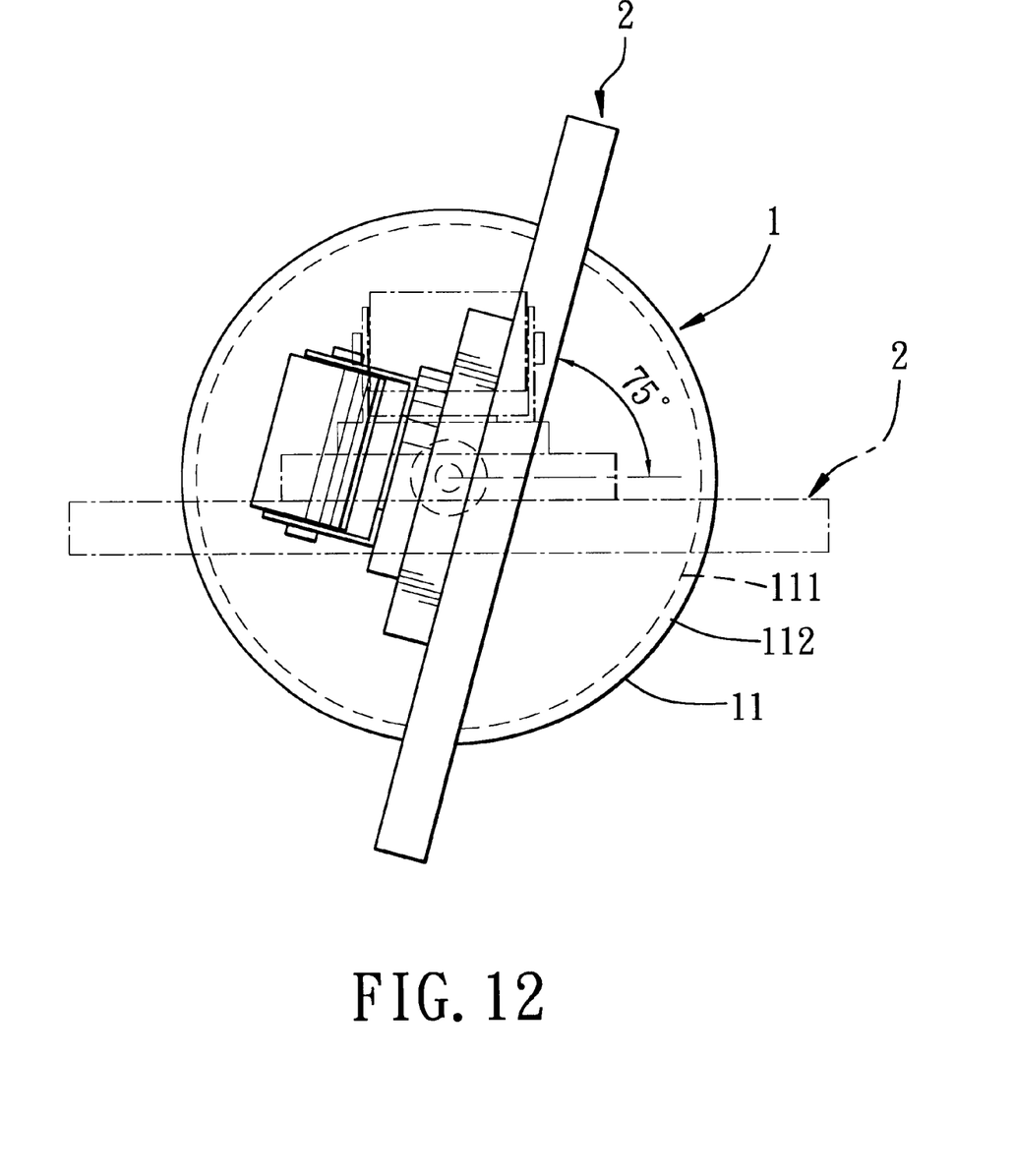
FIG. 12 is a schematic top view showing the preferred embodiment in a further state of use.

The universal joint member 16 is coupled to the upper end portion 1311 of the frame body of the movable frame member 13, and is adapted to be coupled to the display panel 2. In this embodiment, the universal joint member 16 includes a first coupling piece 161 coupled pivotally to the upper end portion 1311 of the frame body 131 such that the first coupling piece 161 is rotatable relative to the upper end portion 1311 of the frame body 131 about an axis (b) parallel to the second direction (B), and a second coupling piece 162 coupled pivotally to the first coupling piece 161 such that the second coupling piece 162 is rotatable relative to the first coupling piece 161 about an axis (c) transverse to the first and second directions (A, B). Therefore, the display panel 2 is rotatable about the axes (a, b, c). As shown in FIGS. 10, the display panel 2 can be rotated about the axis (b) within a range of 0°–35° in a clockwise direction and within a range of 0°–5° in a counterclockwise direction. As shown in FIG. 11, the display panel 2 can be rotated about the axis (c) from an initial position to a 90° position. As shown in FIG. 12, in view of the rotatable configuration of the supporting base 11, the display panel 2 can be rotated about the axis (a) within a range of 0°–75° in a clockwise or counter clockwise direction.

Figure 7:
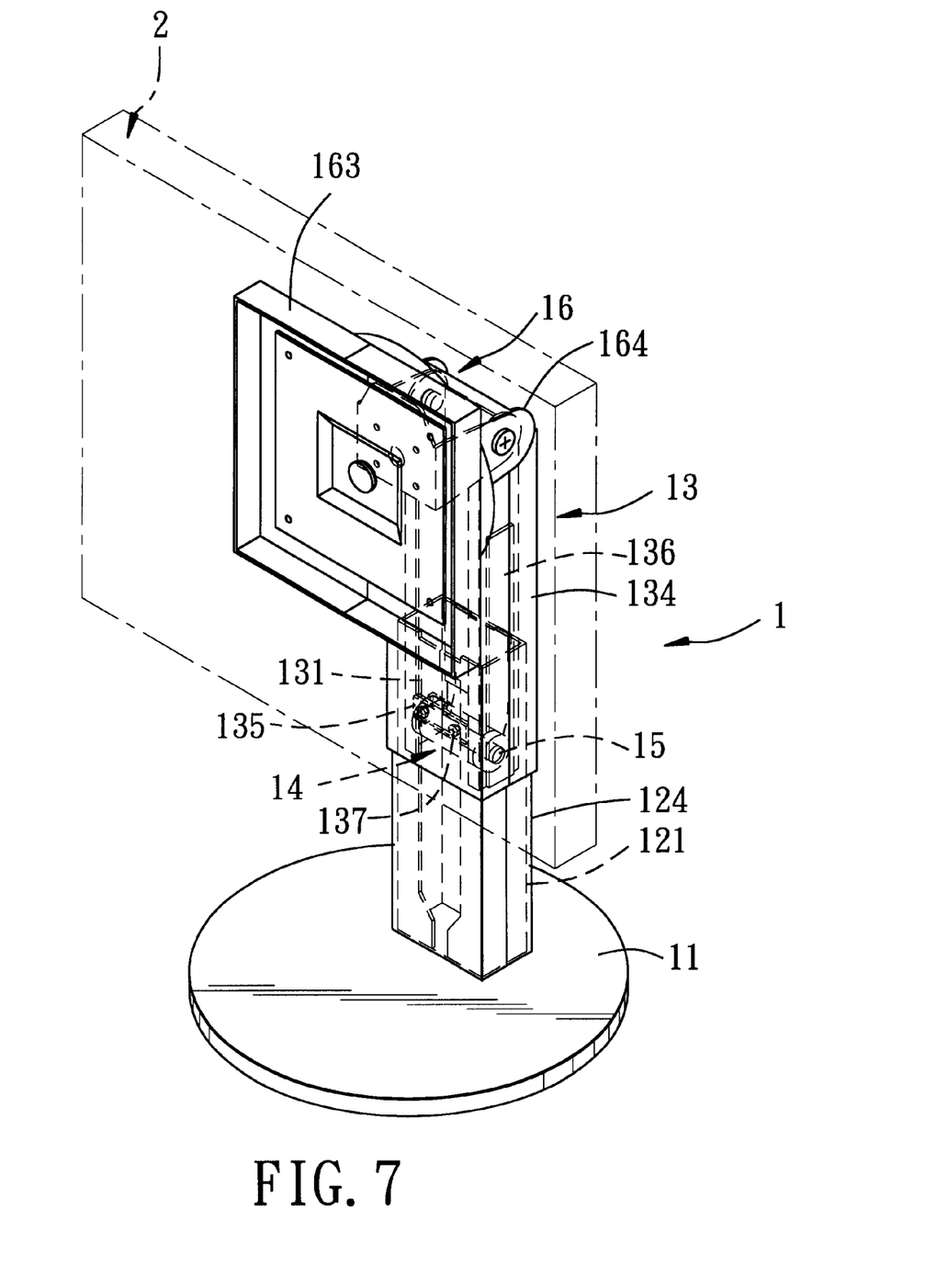
FIG. 7 is an assembled perspective view of the preferred embodiment.

For decorative and protection purposes, a plurality of cover pieces 163, 164, 134, 124 are provided for covering the second coupling piece 162, the first coupling piece 161, the movable frame member 13 and the coupling member 12, respectively, as best shown in FIG. 7.

To sum up, due to the presence of the biasing member 14, the adjustable supporting device 1 can be easily adjusted. It is noted that, due to the presence of the axial rod 15 and the end caps 151, the spiral portion 143 of the biasing member 14 can be positioned in the receiving space 1313 such that smooth sliding movement of the movable frame member 13 relative to the coupling member 12 can be ensured during adjustment of the height of the display panel 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An adjustable supporting device for a display panel, comprising:

a supporting base;

a tubular coupling member disposed uprightly on said supporting base and extending in a first direction, said coupling member having an upper end, and a lower end connected to said supporting base;

a movable frame member movably extended into said coupling member and in friction engagement with said coupling member, said movable frame member including a frame body that has an upper end portion adapted to be coupled to the display panel, and a lower end portion formed with a receiving space and a passage groove communicated with said receiving space; and a biasing member having a straight coupling portion passing through said passage groove in said lower end portion of said frame body and coupled to said coupling member, and a spiral portion connected to said coupling portion and disposed in said receiving space in said lower end portion of said frame body, said spiral portion having an axis, said biasing member providing a biasing force such that an equilibrium state among the biasing force, a friction force between said coupling member and said movable frame member, and the combined weight of the display panel and said movable frame member is achieved so as to maintain said movable frame member at a desired extended position between upper and lower limit positions relative to said coupling member;

wherein said movable frame member further includes an axial rod extending through said spiral portion along said axis and in a second direction transverse to the first direction, said axial rod engaging said frame body such that said spiral portion of said biasing member is positioned in said receiving space in said lower end portion of said frame body.

2. The adjustable supporting device as claimed in claim 1, wherein said frame body includes opposite lateral walls arranged in the second direction, each of said lateral walls having a lower portion formed with an engaging hole, said lower portions of said lateral walls confining said receiving space, said axial rod having opposite ends, each of which engages a corresponding one of said engaging holes in said lower portions of said lateral walls.

3. The adjustable supporting device as claimed in claim 2, wherein said movable frame member further includes a pair of contact plates mounted respectively on said lateral walls of said frame body and abutting against an inner surface of said coupling member.

4. The adjustable supporting device as claimed in claim 1, further comprising a pair of end caps sleeved on said axial rod and abutting against opposite sides of said spiral portion of said biasing member in the second direction, respectively.

5. The adjustable supporting device as claimed in claim 1, wherein said coupling member is formed with a guiding slot extending in the first direction, said movable frame member further including a positioning piece mounted on said lower end portion and extending into said guiding slot such that said positioning piece is movable along said guiding slot.

6. The adjustable supporting device as claimed in claim 1, wherein said coupling portion of said biasing member has a distal hook end that engages said upper end of said coupling member.

7. The adjustable supporting device as claimed in claim 1, wherein said supporting base includes a stationary lower base member, and a rotatable upper base member disposed on top of said lower base member and rotatable relative to said lower base member about an axis parallel to the first direction, said coupling member being disposed on said upper base member.

8. The adjustable supporting device as claimed in claim 1, further comprising a universal joint member coupled to said upper end portion of said frame body of said movable frame member and adapted to be coupled to the display panel.

* * * * *